(12) United States Patent
Lin et al.

(10) Patent No.: US 7,706,044 B2
(45) Date of Patent: Apr. 27, 2010

(54) OPTICAL INTERFERENCE DISPLAY CELL AND METHOD OF MAKING THE SAME

(75) Inventors: Wen-Jian Lin, Hsinchu (TW); Hsiung-Kuang Tsai, Taipei (TW)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 807 days.

(21) Appl. No.: 11/413,603

(22) Filed: Apr. 28, 2006

(65) Prior Publication Data

US 2006/0257070 A1   Nov. 16, 2006

Related U.S. Application Data

(63) Continuation of application No. 10/796,997, filed on Mar. 11, 2004, now Pat. No. 7,078,293.

(30) Foreign Application Priority Data

May 26, 2003   (TW)   .............................. 92114188 A

(51) Int. Cl.
  *G02F 1/03*   (2006.01)
  *G02B 26/00*   (2006.01)
(52) U.S. Cl. .................. 359/254; 359/291; 359/295
(58) Field of Classification Search ................ 359/214, 359/223, 224, 243, 245, 247, 254, 290, 291, 359/292, 295, 298, 846; 345/60, 87, 90, 345/107; 348/203; 216/12, 41, 72; 257/59; 427/100
See application file for complete search history.

(56) References Cited

U.S. PATENT DOCUMENTS

| | | | |
|---|---|---|---|
| 2,534,846 A | 12/1950 | Ambrose et al. | |
| 3,439,973 A | 4/1969 | Paul et al. | |
| 3,443,854 A | 5/1969 | Weiss | |
| 3,483,349 A * | 12/1969 | Wanner | 219/107 |
| 3,539,455 A * | 11/1970 | Clark, Jr. | 205/778 |
| 3,616,312 A | 10/1971 | McGriff et al. | |
| 3,653,741 A | 4/1972 | Marks | |
| 3,656,836 A | 4/1972 | de Cremoux et al. | |
| 3,725,868 A | 4/1973 | Malmer, Jr. et al. | |

(Continued)

FOREIGN PATENT DOCUMENTS

CH   681 047   12/1992

(Continued)

OTHER PUBLICATIONS

Austrian Search Report for EX72/2005 dated May 13, 2005.

(Continued)

*Primary Examiner*—Loha Ben
(74) *Attorney, Agent, or Firm*—Knobbe Martens Olson & Bear LLP

(57) ABSTRACT

An optical interference display cell is described. A first electrode and a sacrificial layer are sequentially formed on a transparent substrate and at least two openings are formed in the first electrode and the sacrificial layer to define a position of the optical interference display cell. An insulated heat-resistant inorganic supporter is formed in each of the openings. A second electrode is formed on the sacrificial layer and the supporters. Finally, a remote plasma etching process is used for removing the sacrificial layer.

12 Claims, 2 Drawing Sheets

U.S. PATENT DOCUMENTS

| | | |
|---|---|---|
| 3,813,265 A | 5/1974 | Marks |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,617,608 A | 10/1986 | Blonder et al. |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,859,060 A | 8/1989 | Katagiri et al. |
| 4,900,136 A | 2/1990 | Goldburt et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,299,041 A | 3/1994 | Morin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,330,617 A | 7/1994 | Haond |
| 5,331,454 A | 7/1994 | Hornbeck |
| 5,339,116 A | 8/1994 | Urbanus et al. |
| 5,345,328 A | 9/1994 | Fritz et al. |
| 5,347,377 A | 9/1994 | Revelli, Jr. et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,503,952 A | 4/1996 | Suzuki et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |

| | | | |
|---|---|---|---|
| 5,608,468 A | 3/1997 | Gove et al. | |
| 5,610,438 A | 3/1997 | Wallace et al. | |
| 5,610,624 A | 3/1997 | Bhuva | |
| 5,610,625 A | 3/1997 | Sampsell | |
| 5,619,059 A | 4/1997 | Li et al. | |
| 5,619,365 A | 4/1997 | Rhoades et al. | |
| 5,619,366 A | 4/1997 | Rhoads et al. | |
| 5,622,814 A | 4/1997 | Miyata et al. | |
| 5,629,790 A | 5/1997 | Neukermans et al. | |
| 5,633,652 A | 5/1997 | Kanbe et al. | |
| 5,636,052 A | 6/1997 | Arney et al. | |
| 5,636,185 A | 6/1997 | Brewer et al. | |
| 5,638,084 A | 6/1997 | Kalt | |
| 5,638,946 A | 6/1997 | Zavracky | |
| 5,641,391 A | 6/1997 | Hunter et al. | |
| 5,646,768 A | 7/1997 | Kaeiyama | |
| 5,647,819 A | 7/1997 | Fujita et al. | |
| 5,650,834 A | 7/1997 | Nakagawa et al. | |
| 5,650,881 A | 7/1997 | Hornbeck | |
| 5,654,741 A | 8/1997 | Sampsell et al. | |
| 5,657,099 A | 8/1997 | Doherty et al. | |
| 5,659,374 A | 8/1997 | Gale, Jr. et al. | |
| 5,665,997 A | 9/1997 | Weaver et al. | |
| 5,673,139 A | 9/1997 | Johnson | |
| 5,674,757 A | 10/1997 | Kim | |
| 5,683,591 A | 11/1997 | Offenberg | |
| 5,703,710 A | 12/1997 | Brinkman et al. | |
| 5,706,022 A | 1/1998 | Hato | |
| 5,710,656 A | 1/1998 | Goosen | |
| 5,726,480 A | 3/1998 | Pister | |
| 5,739,945 A | 4/1998 | Tayebati | |
| 5,745,193 A | 4/1998 | Urbanus et al. | |
| 5,745,281 A | 4/1998 | Yi et al. | |
| 5,771,116 A | 6/1998 | Miller et al. | |
| 5,784,190 A | 7/1998 | Worley | |
| 5,784,212 A | 7/1998 | Hornbeck | |
| 5,793,504 A | 8/1998 | Stoll | |
| 5,808,780 A | 9/1998 | McDonald | |
| 5,818,095 A | 10/1998 | Sampsell | |
| 5,822,110 A * | 10/1998 | Dabbaj | 359/293 |
| 5,822,170 A | 10/1998 | Cabuz et al. | |
| 5,824,608 A | 10/1998 | Gotoch et al. | |
| 5,825,528 A | 10/1998 | Goosen | |
| 5,835,255 A | 11/1998 | Miles | |
| 5,838,484 A | 11/1998 | Goosen et al. | |
| 5,842,088 A | 11/1998 | Thompson | |
| 5,867,302 A | 2/1999 | Fleming et al. | |
| 5,912,758 A | 6/1999 | Knipe et al. | |
| 5,943,158 A | 8/1999 | Ford et al. | |
| 5,959,763 A | 9/1999 | Bozler et al. | |
| 5,967,163 A | 10/1999 | Pan et al. | |
| 5,972,193 A | 10/1999 | Chou et al. | |
| 5,976,902 A | 11/1999 | Shih | |
| 5,986,796 A | 11/1999 | Miles | |
| 6,016,693 A | 1/2000 | Viani et al. | |
| 6,028,690 A | 2/2000 | Carter et al. | |
| 6,031,653 A | 2/2000 | Wang | |
| 6,038,056 A | 3/2000 | Florence et al. | |
| 6,040,937 A | 3/2000 | Miles | |
| 6,049,317 A | 4/2000 | Thompson et al. | |
| 6,055,090 A | 4/2000 | Miles | |
| 6,057,903 A | 5/2000 | Colgan et al. | |
| 6,061,075 A | 5/2000 | Nelson et al. | |
| 6,099,132 A | 8/2000 | Kaeriyama | |
| 6,100,872 A | 8/2000 | Aratani et al. | |
| 6,113,239 A | 9/2000 | Sampsell et al. | |
| 6,115,326 A | 9/2000 | Puma et al. | |
| 6,147,790 A | 11/2000 | Meier et al. | |
| 6,158,156 A | 12/2000 | Patrick | |
| 6,160,833 A | 12/2000 | Floyd et al. | |
| 6,165,890 A | 12/2000 | Kohl et al. | |
| 6,166,422 A | 12/2000 | Qian et al. | |
| 6,180,428 B1 | 1/2001 | Peeters et al. | |
| 6,194,323 B1 | 2/2001 | Downey et al. | |
| 6,195,196 B1 | 2/2001 | Kimura et al. | |
| 6,201,633 B1 | 3/2001 | Peeters et al. | |
| 6,204,080 B1 | 3/2001 | Hwang | |
| 6,215,221 B1 | 4/2001 | Cabuz et al. | |
| 6,232,936 B1 | 5/2001 | Gove et al. | |
| 6,243,149 B1 | 6/2001 | Swanson et al. | |
| 6,246,398 B1 | 6/2001 | Koo | |
| 6,249,039 B1 | 6/2001 | Harvey et al. | |
| 6,282,010 B1 | 8/2001 | Sulzbach et al. | |
| 6,284,560 B1 | 9/2001 | Jech et al. | |
| 6,288,472 B1 | 9/2001 | Cabuz et al. | |
| 6,295,154 B1 | 9/2001 | Laor et al. | |
| 6,297,072 B1 | 10/2001 | Tilmans et al. | |
| 6,323,982 B1 | 11/2001 | Hornbeck | |
| 6,327,071 B1 | 12/2001 | Kimura et al. | |
| 6,329,297 B1 | 12/2001 | Balish et al. | |
| 6,335,831 B2 | 1/2002 | Kowarz et al. | |
| 6,351,329 B1 | 2/2002 | Greywall | |
| 6,356,254 B1 | 3/2002 | Kimura | |
| 6,359,673 B1 | 3/2002 | Stephenson | |
| 6,376,787 B1 | 4/2002 | Martin et al. | |
| 6,377,233 B2 | 4/2002 | Colgan et al. | |
| 6,391,675 B1 | 5/2002 | Ehmke et al. | |
| 6,392,233 B1 | 5/2002 | Channin et al. | |
| 6,392,781 B1 | 5/2002 | Kim et al. | |
| 6,407,851 B1 | 6/2002 | Islam et al. | |
| 6,447,126 B1 | 9/2002 | Hornbeck | |
| 6,448,622 B1 | 9/2002 | Franke et al. | |
| 6,452,465 B1 | 9/2002 | Brown et al. | |
| 6,456,420 B1 | 9/2002 | Goodwin-Johansson | |
| 6,465,355 B1 | 10/2002 | Horsley | |
| 6,466,354 B1 | 10/2002 | Gudeman | |
| 6,466,358 B2 | 10/2002 | Tew | |
| 6,473,274 B1 | 10/2002 | Maimone et al. | |
| 6,480,177 B2 | 11/2002 | Doherty et al. | |
| 6,496,122 B2 | 12/2002 | Sampsell | |
| 6,513,911 B1 | 2/2003 | Ozaki et al. | |
| 6,522,801 B1 | 2/2003 | Aksyuk et al. | |
| 6,531,945 B1 | 3/2003 | Ahn et al. | |
| 6,535,318 B1 * | 3/2003 | Wood et al. | 359/224 |
| 6,537,427 B1 | 3/2003 | Raina et al. | |
| 6,545,335 B1 | 4/2003 | Chua et al. | |
| 6,548,908 B2 | 4/2003 | Chua et al. | |
| 6,549,338 B1 | 4/2003 | Wolverton et al. | |
| 6,552,840 B2 | 4/2003 | Knipe | |
| 6,574,033 B1 | 6/2003 | Chui et al. | |
| 6,577,785 B1 | 6/2003 | Spahn et al. | |
| 6,589,625 B1 | 7/2003 | Kothari et al. | |
| 6,600,201 B2 | 7/2003 | Hartwell et al. | |
| 6,602,791 B2 | 8/2003 | Ouellet et al. | |
| 6,606,175 B1 | 8/2003 | Sampsell et al. | |
| 6,608,268 B1 | 8/2003 | Goldsmith | |
| 6,610,440 B1 | 8/2003 | LaFollette et al. | |
| 6,618,187 B2 | 9/2003 | Pilossof | |
| 6,625,047 B2 | 9/2003 | Coleman, Jr. | |
| 6,630,786 B2 | 10/2003 | Cummings et al. | |
| 6,632,698 B2 | 10/2003 | Ives | |
| 6,635,919 B1 * | 10/2003 | Melendez et al. | 257/312 |
| 6,642,913 B1 | 11/2003 | Kimura et al. | |
| 6,643,069 B2 | 11/2003 | Dewald | |
| 6,650,455 B2 | 11/2003 | Miles | |
| 6,657,832 B2 | 12/2003 | Williams et al. | |
| 6,666,561 B1 | 12/2003 | Blakley | |
| 6,674,090 B1 | 1/2004 | Chua et al. | |
| 6,674,562 B1 | 1/2004 | Miles et al. | |
| 6,674,563 B2 | 1/2004 | Chui et al. | |
| 6,680,792 B2 | 1/2004 | Miles | |
| 6,687,896 B1 | 2/2004 | Royce et al. | |
| 6,710,908 B2 | 3/2004 | Miles et al. | |
| 6,713,235 B1 | 3/2004 | Ide et al. | |
| 6,720,267 B1 | 4/2004 | Chen et al. | |
| 6,736,987 B1 | 5/2004 | Cho | |

| | | | | | |
|---|---|---|---|---|---|
| 6,741,377 B2 * | 5/2004 | Miles ............... 359/243 | 2002/0117728 A1 | 8/2002 | Brosnihan et al. |
| 6,741,384 B1 | 5/2004 | Martin et al. | 2002/0126364 A1 | 9/2002 | Miles |
| 6,741,503 B1 | 5/2004 | Farris et al. | 2002/0135857 A1 | 9/2002 | Fitzpatrick et al. |
| 6,743,570 B2 | 6/2004 | Harnett et al. | 2002/0137072 A1 | 9/2002 | Mirkin et al. |
| 6,747,785 B2 | 6/2004 | Chen et al. | 2002/0149828 A1 | 10/2002 | Miles |
| 6,747,800 B1 | 6/2004 | Lin | 2002/0168136 A1 | 11/2002 | Atia et al. |
| 6,756,317 B2 | 6/2004 | Sniegowski et al. | 2003/0006468 A1 | 1/2003 | Ma et al. |
| 6,768,097 B1 | 7/2004 | Viktorovitch et al. | 2003/0043157 A1 | 3/2003 | Miles |
| 6,775,174 B2 | 8/2004 | Huffman et al. | 2003/0054588 A1 | 3/2003 | Patel et al. |
| 6,778,155 B2 | 8/2004 | Doherty et al. | 2003/0062186 A1 | 4/2003 | Boroson et al. |
| 6,778,306 B2 | 8/2004 | Sniegowski et al. | 2003/0072070 A1 | 4/2003 | Miles |
| 6,782,166 B1 | 8/2004 | Grote et al. | 2003/0077843 A1 | 4/2003 | Yamauchi et al. |
| 6,794,119 B2 | 9/2004 | Miles | 2003/0090350 A1 | 5/2003 | Feng et al. |
| 6,806,110 B2 | 10/2004 | Lester et al. | 2003/0112096 A1 | 6/2003 | Potter |
| 6,811,267 B1 | 11/2004 | Allen et al. | 2003/0138213 A1 | 7/2003 | Jiin et al. |
| 6,812,482 B2 | 11/2004 | Fleming et al. | 2003/0152872 A1 | 8/2003 | Miles |
| 6,819,469 B1 | 11/2004 | Koba | 2003/0201784 A1 | 10/2003 | Potter |
| 6,822,628 B2 | 11/2004 | Dunphy et al. | 2003/0202264 A1 | 10/2003 | Weber et al. |
| 6,829,132 B2 | 12/2004 | Martin et al. | 2003/0202265 A1 | 10/2003 | Reboa et al. |
| 6,853,129 B1 | 2/2005 | Cummings et al. | 2003/0202266 A1 | 10/2003 | Ring et al. |
| 6,855,610 B2 | 2/2005 | Tung et al. | 2003/0231373 A1 | 12/2003 | Kowarz et al. |
| 6,859,218 B1 | 2/2005 | Luman et al. | 2004/0010115 A1 | 1/2004 | Sotzing |
| 6,861,277 B1 | 3/2005 | Monroe et al. | 2004/0027636 A1 | 2/2004 | Miles |
| 6,862,022 B2 | 3/2005 | Slupe | 2004/0027701 A1 | 2/2004 | Ishikawa |
| 6,862,029 B1 | 3/2005 | D'Souza et al. | 2004/0028849 A1 | 2/2004 | Stark et al. |
| 6,867,896 B2 | 3/2005 | Miles | 2004/0035821 A1 | 2/2004 | Doan et al. |
| 6,870,581 B2 | 3/2005 | Li et al. | 2004/0038513 A1 | 2/2004 | Kohl et al. |
| 6,870,654 B2 | 3/2005 | Lin et al. | 2004/0051929 A1 | 3/2004 | Sampsell et al. |
| 6,882,458 B2 | 4/2005 | Lin et al. | 2004/0053434 A1 | 3/2004 | Bruner |
| 6,882,461 B1 | 4/2005 | Tsai et al. | 2004/0058532 A1 | 3/2004 | Miles et al. |
| 6,912,022 B2 | 6/2005 | Lin et al. | 2004/0058534 A1 | 3/2004 | Okada |
| 6,947,195 B2 | 9/2005 | Ohtaka et al. | 2004/0061543 A1 | 4/2004 | Nam et al. |
| 6,952,303 B2 | 10/2005 | Lin et al. | 2004/0063322 A1 | 4/2004 | Yang |
| 6,952,304 B2 | 10/2005 | Mushika | 2004/0080807 A1 | 4/2004 | Chen et al. |
| 6,953,702 B2 | 10/2005 | Miller et al. | 2004/0080832 A1 | 4/2004 | Singh |
| 6,958,847 B2 | 10/2005 | Lin | 2004/0087086 A1 | 5/2004 | Lee |
| 6,972,891 B2 | 12/2005 | Patel et al. | 2004/0100677 A1 | 5/2004 | Huibers et al. |
| 6,982,820 B2 | 1/2006 | Tsai | 2004/0124073 A1 | 7/2004 | Pilans et al. |
| 6,995,890 B2 | 2/2006 | Lin | 2004/0124483 A1 | 7/2004 | Partridge et al. |
| 6,999,225 B2 | 2/2006 | Lin | 2004/0124495 A1 | 7/2004 | Chen et al. |
| 6,999,236 B2 | 2/2006 | Lin | 2004/0125281 A1 | 7/2004 | Lin |
| 7,002,441 B2 * | 2/2006 | Pillans et al. .......... 335/78 | 2004/0125282 A1 | 7/2004 | Lin et al. |
| 7,008,812 B1 | 3/2006 | Carley | 2004/0125536 A1 | 7/2004 | Arney et al. |
| 7,012,726 B1 | 3/2006 | Miles | 2004/0136076 A1 | 7/2004 | Tayebati |
| 7,027,202 B1 | 4/2006 | Hunter et al. | 2004/0145049 A1 | 7/2004 | McKinnell et al. |
| 7,041,224 B2 | 5/2006 | Patel et al. | 2004/0145811 A1 | 7/2004 | Lin et al. |
| 7,041,571 B2 | 5/2006 | Strane | 2004/0147056 A1 | 7/2004 | McKinnell et al. |
| 7,049,164 B2 | 5/2006 | Bruner | 2004/0147198 A1 | 7/2004 | Lin et al. |
| 7,078,293 B2 | 7/2006 | Lin et al. | 2004/0148009 A1 | 7/2004 | Buzzard |
| 7,110,158 B2 | 9/2006 | Miles | 2004/0150869 A1 | 8/2004 | Kasai |
| 7,119,945 B2 | 10/2006 | Cummings et al. | 2004/0160143 A1 | 8/2004 | Shreeve et al. |
| 7,123,216 B1 | 10/2006 | Miles | 2004/0174583 A1 | 9/2004 | Chen et al. |
| 7,172,915 B2 | 2/2007 | Lin et al. | 2004/0175577 A1 | 9/2004 | Lin et al. |
| 7,198,973 B2 | 4/2007 | Lin et al. | 2004/0179281 A1 | 9/2004 | Reboa |
| 7,221,495 B2 | 5/2007 | Miles et al. | 2004/0179445 A1 | 9/2004 | Park |
| 7,291,921 B2 | 11/2007 | Lin | 2004/0191937 A1 | 9/2004 | Patel et al. |
| 2001/0003487 A1 | 6/2001 | Miles | 2004/0191946 A1 | 9/2004 | Patel et al. |
| 2001/0026951 A1 | 10/2001 | Vergani et al. | 2004/0197526 A1 | 10/2004 | Mehta |
| 2001/0040649 A1 | 11/2001 | Ozaki | 2004/0207897 A1 | 10/2004 | Lin |
| 2001/0040675 A1 | 11/2001 | True et al. | 2004/0207898 A1 | 10/2004 | Lin et al. |
| 2002/0003400 A1 | 1/2002 | Lee | 2004/0209192 A1 | 10/2004 | Lin et al. |
| 2002/0014579 A1 | 2/2002 | Dunfield | 2004/0209195 A1 | 10/2004 | Lin |
| 2002/0015215 A1 | 2/2002 | Miles | 2004/0212026 A1 | 10/2004 | Van Brocklin et al. |
| 2002/0021485 A1 | 2/2002 | Pilossof | 2004/0217264 A1 | 11/2004 | Wood et al. |
| 2002/0024711 A1 | 2/2002 | Miles | 2004/0217378 A1 | 11/2004 | Martin et al. |
| 2002/0027636 A1 | 3/2002 | Yamada | 2004/0217919 A1 | 11/2004 | Pichl et al. |
| 2002/0036304 A1 | 3/2002 | Ehmke et al. | 2004/0218251 A1 | 11/2004 | Piehl et al. |
| 2002/0054424 A1 | 5/2002 | Miles | 2004/0218334 A1 | 11/2004 | Martin et al. |
| 2002/0055253 A1 | 5/2002 | Rudhard | 2004/0218341 A1 | 11/2004 | Martin et al. |
| 2002/0071169 A1 | 6/2002 | Bowers et al. | 2004/0227493 A1 | 11/2004 | Van Brocklin et al. |
| 2002/0075555 A1 | 6/2002 | Miles | 2004/0240027 A1 | 12/2004 | Lin et al. |
| 2002/0086455 A1 | 7/2002 | Franosch et al. | 2004/0240032 A1 | 12/2004 | Miles |
| 2002/0110948 A1 | 8/2002 | Huang et al. | 2004/0240138 A1 | 12/2004 | Martin et al. |

| | | | | | | |
|---|---|---|---|---|---|---|
| 2004/0245588 A1 | 12/2004 | Nikkel et al. | | KR | 2002-9270 | 10/1999 |
| 2004/0263944 A1 | 12/2004 | Miles et al. | | KR | 2000-0033006 | 6/2000 |
| 2005/0001828 A1 | 1/2005 | Martin et al. | | TW | 157313 | 5/1991 |
| 2005/0003667 A1 | 1/2005 | Lin et al. | | WO | WO 91/05284 | 4/1991 |
| 2005/0020089 A1 | 1/2005 | Shi et al. | | WO | WO 92/10925 | 6/1992 |
| 2005/0024557 A1 | 2/2005 | Lin | | WO | WO9530924 | 11/1995 |
| 2005/0035699 A1 | 2/2005 | Tsai | | WO | WO9717628 | 5/1997 |
| 2005/0036095 A1 | 2/2005 | Yeh et al. | | WO | WO9952006 A2 | 10/1999 |
| 2005/0036192 A1 | 2/2005 | Lin et al. | | WO | WO9952006 A3 | 10/1999 |
| 2005/0038950 A1 | 2/2005 | Adelmann | | WO | WO0114248 | 3/2001 |
| 2005/0042117 A1 | 2/2005 | Lin | | WO | WO 01/063657 | 8/2001 |
| 2005/0046922 A1 | 3/2005 | Lin et al. | | WO | WO 02/24570 | 3/2002 |
| 2005/0046948 A1 | 3/2005 | Lin | | WO | WO03007049 A1 | 1/2003 |
| 2005/0057442 A1 | 3/2005 | Way | | WO | WO3052506 | 6/2003 |
| 2005/0068583 A1 | 3/2005 | Gutkowski et al. | | WO | WO 03/069413 A | 8/2003 |
| 2005/0068605 A1 | 3/2005 | Tsai | | WO | WO03069413 A1 | 8/2003 |
| 2005/0068606 A1 | 3/2005 | Tsai | | WO | WO03073151 A1 | 9/2003 |
| 2005/0069209 A1 | 3/2005 | Damera-Venkata et al. | | WO | WO2004006003 A1 | 1/2004 |
| 2005/0078348 A1 | 4/2005 | Lin | | WO | WO2004026757 A2 | 4/2004 |
| 2005/0118832 A1 | 6/2005 | Korzenski et al. | | WO | WO 2004/055885 | 7/2004 |
| 2005/0168849 A1 | 8/2005 | Lin | | WO | WO 2004/079056 | 9/2004 |
| 2005/0195462 A1 | 9/2005 | Lin | | WO | WO 2005/019899 A1 | 3/2005 |
| 2005/0195467 A1 | 9/2005 | Kothari et al. | | WO | WO 2005/085932 A | 9/2005 |
| 2005/0202649 A1 | 9/2005 | Hung et al. | | WO | WO 2006/036385 | 4/2006 |
| 2006/0066932 A1 | 3/2006 | Chui | | WO | WO 2006/036437 | 4/2006 |
| 2006/0256420 A1 | 11/2006 | Miles et al. | | WO | WO 2006/036542 | 4/2006 |
| 2007/0269748 A1 | 11/2007 | Miles | | | | |
| 2008/0026328 A1 | 1/2008 | Miles | | | | |
| 2008/0068699 A1 | 3/2008 | Miles | | | | |
| 2008/0130089 A1 | 6/2008 | Miles | | | | |

FOREIGN PATENT DOCUMENTS

| | | |
|---|---|---|
| CN | 092109265 | 11/2003 |
| DE | 199 38 072 | 3/2000 |
| DE | 10228946 A1 | 1/2004 |
| EP | 0 035 299 | 9/1983 |
| EP | 0173808 | 3/1986 |
| EP | 0 667 548 A1 | 8/1995 |
| EP | 0 694 801 | 1/1996 |
| EP | 0 695 959 | 2/1996 |
| EP | 0 788 005 | 8/1997 |
| EP | 0 878 824 A2 | 11/1998 |
| EP | 1 197 778 | 4/2002 |
| EP | 1 209 738 | 5/2002 |
| EP | 1258860 A1 | 11/2002 |
| EP | 1 452 481 A | 9/2004 |
| JP | 49-004993 | 11/1974 |
| JP | 05275401 A1 | 10/1993 |
| JP | 07-106303 | 4/1995 |
| JP | 10-148644 | 6/1998 |
| JP | 10-267658 | 10/1998 |
| JP | 11-160635 | 6/1999 |
| JP | 11211999 A | 8/1999 |
| JP | 11-243214 | 9/1999 |
| JP | 2000-40831 A | 2/2000 |
| JP | 2002-270575 | 9/2000 |
| JP | 2001-001300 | 1/2001 |
| JP | 2001-085519 | 3/2001 |
| JP | 2002-287047 | 3/2001 |
| JP | 2002 062493 | 2/2002 |
| JP | 2002-207182 | 7/2002 |
| JP | 2002-243937 | 8/2002 |
| JP | 2002-270575 | 9/2002 |
| JP | 2002-328313 | 11/2002 |
| JP | 2002-355800 | 12/2002 |
| JP | 2002-357777 | 12/2002 |
| JP | 2003001598 A | 1/2003 |
| JP | 2004-133281 | 4/2004 |
| JP | 2004102022 A | 4/2004 |
| JP | 2004106074 A | 4/2004 |
| JP | 2004-212656 | 7/2004 |
| JP | 2005051007 A | 2/2005 |

OTHER PUBLICATIONS

Austrian Search Report for EX81/2005 dated May 18, 2005.
Austrian Search Report for EX170/2005 dated Jul. 6, 2005.
Austrian Search Report for EX139/2005 dated Jul. 27, 2005.
Austrian Search Report for EX144/2005 dated Aug. 11, 2005.
Bains, "Digital Paper Display Technology Holds Promise for Portables," CommsDesign EE Times (2000).
Bass, Handbook of Optics, vol. 1, Fundamentals, Techniques, and Design, Second Edition, McGraw-Hill, inc. New York pp. 2.29/2.36 (1995).
Chu, et al. "Formation and Microstructures of Anodic Aluminoa Films from Aluminum Sputtered onglass Substrate" Journal of the Electrochemical Society, 149 (7) B321-B327 (2002).
Crouse, "Self-ordered pore structure of anodized aluminum on silicon and pattern transfer" Applied Physics Letters, vol. 76, No. 1, Jan. 3, 2000. pp. 49-51.
French, P.J. "Development of Surface Micromachining techniques compatable with on-chip electronics" Journal of Micromechanics and Microengineering vol. 6 No. 2, 197-211 XP 002360789 Jun. 1996 IOP Publishing.
Furneaux, et al. "The Formation of Controlled-porosity membranes from Anodically Oxidized Aluminium" Nature vo 337 Jan. 12, 1989, pp. 147-149.
Jerman J. H. et al., " Maniature Fabry-Perot Interferometers Micromachined in Silicon for Use in Optical Fiber WDM Systems," Transducers. San Francisco, Jun. 24-27, 1991, Proceedings of the Internatioal Conference on Solid State Sensors Andactuators, New Youk IEEE, US, vol. Conf. 6, Jun. 24, 1991.
Lieberman, "MEMS Display Looks to Give PDAs Sharper Image," EE Times (Feb. 11, 1997).
Lieberman, "Microbridges at Heart of New MEMS Displays," EE Times (Apr. 24, 1997).
Maboudian, et al. Critical Review: Adhesion in Surface Micromechanical Structures: J. Vac. Sci Techno. B 15(1) Jan./Feb. 1997, pp. 1-20.
Microchem, LOR Lift-Off Resists Datasheet, 2002.
Miles, "Interferometric Modulation: MOEMS as an Enabling Technology for High-Performance Reflective Displays," Proceedings of the International Society for Optical Engineering, San Jose, CA, vol. 49085, pp. 131-139 (Jan. 28, 2003).
Miles, et al., "10.1: Digital Paper for Reflective Displays," 2002 SID International Symposium Digest of Technical Papers, Boston, MA, SID International Symposium Digest of Technical Papers, San Jose, CA, vol. 33 /1, pp. 115-117 (May 21-23, 2002).
Science and Technology, The Economist, pp. 89-90, (May 1999).

Search Report PCT/US05/030033 and Written Opinion.
Search Report PCT/US05/030902.
Search Report and Written Opinion for PCT/US05/33558 (May 19, 2005).
Search Report PCT/US05/032331 (Apr. 7, 2006).
Search Report PCT/US05/032331 (Jan. 9, 2006).
Search Report and written opinion PCT/US05/032647.
Tayebi et al. "Reducing the Effects of adhesion and friction in microelectomechanical systesm (MEMS) through surface roughening: Comparision Between theory and experiments" http://jap.ajp.org/jap/copyright.isp Journal of applied Physics 98, 073528 (2005).
Thin Film Transistors- Materials and Processes -Volume1 Amorphous Silicon Thin Film Transistors ed. Yue Kuo, Kluwer Academic Publishers, Boston (2004).
Xactix Xetch X Specifications, http://xactix.com/Xtech X3specs.htm. Jan. 5, 2005.
Yao et al., BrF3 dry release technology for large freestanding parylene microstructures and electrostatic actuators, Sensors and Actuators A, vol. 97-98, pp. 771-775, Apr. 2002.
Frist Office Action dated Feb. 10, 2006 in Chinese App. No. 031480721.
Second Office Action dated received Aug. 23, 2006 Feb. 10, 2006 in Chinese App. No. 031480721.
Notification of Reasons for Rejecton dated Nov. 29, 2006 in Japanese App. No. 2004-102018.
Decision of Rejecton dated Mar. 28, 2007 in Japanese App. No. 2004-102018.
Akasaka, "Three/Dimensional IC Trends," Proceedings of IEEE, vol. 74, No. 12, pp. 17031714, (Dec. 1986).
Austrian Search Report dated May 4, 2005.
Austrian Search Report dated Aug. 12, 2005.
Aratani K. et al,"Process and Design Considerations for Survace Micromachined Beams for a Tuneable Interferometer Array in Silicon, " Proceedings of the Workshop on Micro Electro Mechanical Systems (MEMS) Fort Lauderale, Feb. 7-10, 1993, New York, IEEE, US, vol. Workshop 6, Feb. 7, 1993, pp. 230235.
Aratani et al., "Surface micromachined tuneable interferometer array," Sensors and Actuators, pp. 1723. (1994).
Conner, "Hybrid Color Display Using Optical Interference Filter Array," SID Digest, pp. 577580 (1993).
EP 05255661.0 European Search Report (Dec. 30, 2005).
Fan et al., "Channel Drop Filters in Photonic Crystals," Optics Express, vol. 3, No. 1 (1998).
Giles et al., "A Silicon MEMS Optical Switch Attenuator and Its Use in Lightwave Subsystems," IEEE Journal of Selected Topics in Quanum Electronics, vol. 5, No. 1, pp. 18/25, (Jan./Feb. 1999).
Goossen et al., "Possible Display Applications of the Silicon Mechanical Anti-Reflection Switch," Society for Information Display (1994).
Goossen et al., "Silicon Modulator Based on Mechanically Active Anti/Reflection Layer with 1Mbit/sec Capability for Fiber/in/the/Loop Applications," IEEE Photoics Technology Lettes, pp. 1119, 1121 (Sep. 1994).
Goossen K.W., "MEMS/Based Variable Optical Interference Devices", Optical MEMS, 2000 IEEE/Leos International Conference on Aug. 21-24, 2000, Piscataway, NJ, USA, IEE, Aug. 21, 2000, pp. 17/18.
Gosch, "West Germany Grabs the Lead in X/Ray Lithography," Electronics pp. 78/80 (Feb. 5, 1987).
Harnett et al., "Heat/depolymerizable polycarbonates as electron beam patternable sacrificial layers for nanofluidics," J. Vac. Sci. Technol. B 19(6), (Nov./Dec. 2001), pp. 2842/2845.
Howard et al., "Nanometer/Scale Fabrication Techniques," VLSI Electronics: Microstructure Science, vol. 5, pp. 145/153 and pp. 166/173 (1982).
Ibbotson et al., "Comparison of XeF2 and F/atom reactions with Si and SiO2," Applied Physics Leters, vol. 44, No. 12, pp. 1129/1131 (Jun. 1984).
Jackson "Classical Electrodynamics," John Wiley & Sons Inc., pp. 568573. (date unknown).
Jerman et al., "A Miniature Fabry/Perot Interferometer with a Corrugated Silicon Diaphragm Support," (1988).

Joannopoulos et al., "Photonic Crystals: Molding the Flow of Light," Princeton University Press (1995).
Johnson, "Optical Scanners," Microwave Scanning Antennas, vol. 1, p. 251/261, (1964).
Kim et al., "Control of Optical Transmission ThroughMetals Perforated With Subwavelength Hole Arrays," Optic Letters, vol. 24, No. 4, pp. 256/257, (Feb. 1999).
Lee et al., "Electrostatic Actuation of Surface/Bulk Micromachined Singlecrystal Silicon Microresonators", International Conference on Intelligent Robots and Systems, vol. 2, pp. 1057/1062, (Oct. 17-21, 1999).
Lee et al., "The Surface/Bulk Micromachining (SBM) Process: A New Method for Fabricating Released MEMS in Single Crystal Silicon", Journal of Microelectromechanical Systems, vol. 8, Issue 4, pp. 409/416, (Dec. 1999).
Light over Matter, Circle No. 36 (Jun. 1993).
Lin et al., "Free/Space Micromachined Optical Switches for Optical Networking," IEEE Journal of Selected Topics in Quantum Electronics, vol. 5, No. 1, pp. 4/9. (Jan./Feb. 1999).
Little et al., "Vertically Coupled Microring Resonator Channel Dropping Filter," IEEE Photonics Technology Letters, vol. 11, No. 2, (1999).
Magel, "Integrated Optic Devices Using Micromachined Metal Membranes," SPIE vol. 2686,0/8194/2060/Mar. 1996.
Miles, Mark, W., "A New Reflective FPD Technology Using Interferometric Modulation," The Proceedings of the Society for Information Display (May 11-16, 1997).
Nagami et al., "Plastic Cell Architecture: Towards Reconfigurabl Computing For General/Purpose," IEEE, 0/8186/8900/, pp. 68/77, (May 1998).
Newsbreaks, "Quantum/trench devices might operate at terahertz frequencies," Laser Focus World (May 1993).
Oliner et al., "Radiating Elements and Mutual Coupling," Microwave Scanning Antennas, vol. 2, pp. 131/141, (1966).
PCT/US02/13442, Search Report Sep. 13, 2002.
PCT/US04/20330 Search Report Nov. 8, 2004.
PCT/US05/029821 International Search Report (Dec. 27, 2005).
PCT/US05/030927 International Search Report (0125/2006).
PCT/US05/031693 International Search Report.
PCT/US05/032331 International Search Report (Apr. 7, 2006).
PCT/US05/033558 Partial International Search Report (Feb. 24, 2006).
PCT/US2004/035820 International Search Report and Written Opinion (Apr. 11, 2005).
PCT/US96/17731 Search Report.
Raley et al., "A Fabry/Perot Microinterferometer for Visible Wavelengths," IEEE SolidState Sensor and Actuator Workshop, Jun. 1992, Hilton Head, SC.
Schnakenberg et al., "TMAHW Etchants for Silicon Micromachining:" 1991 International Conference on Solid State Sensors and Actuators/Digest of Technical Papers, pp. 815/818 (1991).
Sperger et al., "High Performance Patterned All/Dielectric Interference Colour Filter for Display Applications," SID Digest, pp. 81/83, (1994).
Sridharan et al. "Post/Packaging Release a New Concept for Surface/Micromachined Devices" Technical Digest, IEEE Solid/State Sensor & Actuator Workshop, New York, NY, US, Nov. 8, 1998, pp. 225/228, XP000992464.
Stone, "Radiation and Optics, An Introduction to the Classical Theory," McGraw/Hill, pp. 340/343, (1963).
Walker et al., "Electron/beam/tunable Interference Filter Spatial Light Modulator," Optics Letters vol. 13, No. 5, pp. 345/347, (May 1988).
Williams et al., "Etch Rates for Micromachining Processing," Journal of Microelectromechanical Systems, vol. 5, No. 4, pp. 256/259 (Dec. 1996).
Winters et al., "The etching of silicon with XeF2 vapor. Applied Physics Letters," vol. 34, No. 1, pp. 7073 (Jan. 1979).
Winton, "A novel way to capture solar energy," Chemical Week, (May 1985).
Wu, "Design of a Reflective Color LCD Using Optical Interference Reflectors," ASIA Display '95, pp. 92919931, (Oct. 1995).

Zhou et al., "Waveguide Panel Display Using Electromechancal Spatial Modulators" SID Digest, vol. XXIX, (1998).

Penta Vacuum MEMS Etcher Specifications, HTTP—WWW.PENTAVACUUM.COM-MEMES.HTM, 2002.

Notice of Reasons for Rejection dated Dec. 9, 2008 in Japanese App. No. 2004-102018.

* cited by examiner

OPTICAL INTERFERENCE DISPLAY CELL AND METHOD OF MAKING THE SAME

CROSS-REFERENCE TO RELATED APPLICATIONS

This application is a continuation of U.S. application Ser. No. 10/796,997, filed Mar. 11, 2004, now U.S. Pat. No. 7,078, 293, which claims priority to Taiwan Application No. 092114188, filed May 26, 2003, each of which is hereby incorporated by reference in its entirety.

FIELD OF INVENTION

The present invention relates to a method for manufacturing a structure of a structure release, and more particularly, the present invention relates to a structure of a structure release and a method for manufacturing the same adapted for an optical interference display cell.

BACKGROUND OF THE INVENTION

In a micro electro mechanical system (MEMS), the development of a sacrificial layer technique has become a key factor for manufacturing a suspended structure, such as a cantilever, a beam, a membrane, a channel, a cavity, a joint or hinge, a link, a crank, a gear or a rack, to name a few. A structure release etching process is adapted for removing a sacrificial layer, so a structure of a structure release in a micro electro mechanical system has a critical influence on the process of removing the sacrificial layer.

A conventional structure release etching process is first introduced with an interference display cell as an example. The interference display cell, a kind of a micro electro mechanical system, is used to fabricate a planar display. Planar displays have great superiority in the portable display device and limited-space display market because they are lightweight and small. To date, in addition to liquid crystal displays (LCD), organic electro-luminescent displays (OLED), and plasma display panels (PDP), a mode of optical interference display is another option for planar displays.

FIG. 1A and FIG. 1B illustrate a method for manufacturing a conventional optical interference display cell. Referring to FIG. 1A, a first electrode 110 and a sacrificial layer 111 are formed in sequence on a transparent substrate 109, and openings 112, each suitable for forming a supporter therein, are formed in the first electrode 110 and the sacrificial layer 111. Then, a supporter 106 is formed in each of the openings 112. Next, an electrode 114 is formed on the sacrificial layer 111 and the supporter 106. Subsequently, referring to FIG. 1B, the sacrificial layer 111 shown in FIG. 1A is removed by a release etching process to form a cavity 116, which is located in the position of the sacrificial layer 111, and the length D of the cavity 116 is the thickness of the sacrificial layer 111.

In a micro electro mechanical process, a micro suspended structure is fabricated by the use of a sacrificial layer. A suspended movable microstructure is fabricated by a selective etching between a device structure layer and the sacrificial layer to remove the sacrificial layer and leave the structure layer, and this process is called a structure release etching. The difference between the structure release etching process and an IC process is that in the structure release etching process, the selective etching is an isotropic etching, so that an undercut or an under etching is formed in the structure layer for smooth separation of the structure layer and the substrate.

The most popular structure release etching process is a wet structure release process. In the wet structure release process, a rinsing step and a drying step usually have to be performed after etching, and a microstructure can substantially be suspended above the substrate. However, during the wet structure release process, it is quite easy for the structure and the substrate to stick together, thereby resulting in failure of the device. A dry etching process using xenon difluoride ($XeF_2$) as an etchant can be used to solve the problems due to the wet etching process.

Xenon difluoride is in a solid state at normal temperature and normal pressure, and is sublimated into the gaseous state at low pressure. Xenon difluoride has a high etching rate for silicon materials such as monocrystalline silicon, polysilicon and amorphous silicon, and some metals such as molybdenum (Mo), molybdenum alloy and so on. Xenon is an inert gas, and xenon difluoride is quite unstable. The etching mechanism of xenon difluoride is that two fluorine free radicals are brought to the reaction positions by xenon, and when xenon difluoride contacts the material to be etched, xenon difluoride decomposes to release these two fluorine free radicals. Because the isotropic etching effect of xenon difluoride is great, xenon difluoride has an excellent capacity for lateral etching. In a micro electro mechanical system process, xenon difluoride is used as an etchant to remove a sacrificial layer in a structure release etching process. Typically, since the activity of xenon difluoride is quite high, i.e., the activation energy of the decomposition of xenon difluoride into fluorine free radicals is quite low, and a reaction occurs almost immediately as soon as xenon difluoride contacts the material to be etched even at room temperature. Therefore, raising the etching temperature can hardly increase the etching rate of xenon difluoride. A xenon difluoride etching process is typically conducted at a temperature lower than 70° C.

FIG. 2 illustrates a top view of a conventional optical interference display cell 200. The optical interference display cell 200 includes separation structures 202, as indicated by dotted lines 2021, located on two opposite sides of the optical interference display cell 200, and supporters 204 located on the other two opposite sides of the optical interference display cell 200. The separation structures 202 and the supporters 204 are located between two electrodes. There are gaps between the supporters 204, as well as between the supporters 204 and the separation structures 202. The gaseous xenon difluoride 206 permeates through the gaps and etches a sacrificial layer (not shown in FIG. 2). The etching rate of a structure release etching process using an etchant of the gaseous xenon difluoride 206 depends on the material of the sacrificial layer desired to be etched. Typically, the etching rate exceeds 10 micrometers per minute, and can be up to 20-30 micrometers per minute for some materials. So far as the size of the present optical interference display cell is concerned, one structure release etching process only takes dozens of seconds to 3 minutes.

Although the structure release etching process performed with the etchant of gaseous xenon difluoride has the aforementioned advantages, the structure release etching process has a drawback: the cost can't be reduced due to the character of xenon difluoride itself. Xenon difluoride is expensive, is particularly sensitive to moisture and is unstable. When xenon difluoride contacts moisture, hydrogen fluoride is produced. Hydrogen fluoride is not only dangerous, but also reduces efficiency of etching. Besides, the structure release etching process performed using xenon difluoride as an etchant is rarely found in semiconductor processes and typical planar display processes, so etchers that are well developed in current semiconductor processes and liquid crystal display processes are unsuitable for the structure release etching process using xenon difluoride etchant. Most of the main manufacturing processes of the optical interference display can continue using conventional semiconductor or planar display processing equipment, but the structure release etching process needs a totally different apparatus design. To reorganize and consolidate the processing equipments would be an obstacle to the development and mass production of the optical interference display.

SUMMARY OF THE INVENTION

In one embodiment, a MEMS device is provided, the MEMS device comprising a first electrode formed over a substrate, a second electrode formed over the first electrode and spaced apart from the first electrode by a cavity, and at least two heat-resistant supporters formed over the substrate, wherein the second electrode is formed over and supported by said supporters.

In another embodiment, a MEMS device is provided, the MEMS device comprising a first electrode formed over a substrate, a second electrode formed over the first electrode and spaced apart from the first electrode by a cavity, and at least two inorganic supporters formed over the substrate, wherein the second electrode is formed over and supported by said supporters.

BRIEF DESCRIPTION OF THE DRAWINGS

These and other features, aspects, and advantages of the present invention will be more fully understood by reading the following detailed description of the preferred embodiment, with reference made to the accompanying drawings as follows.

DETAILED DESCRIPTION OF THE PREFERRED EMBODIMENT

Figure 1A:
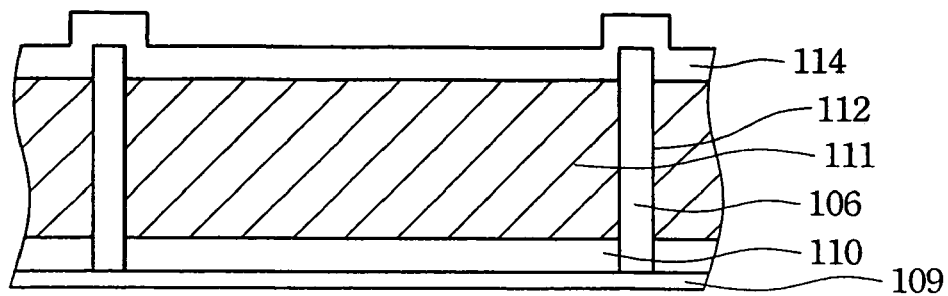
FIG. 1A and FIG. 1B illustrate a method for manufacturing a conventional optical interference display cell.
Figure 1B:
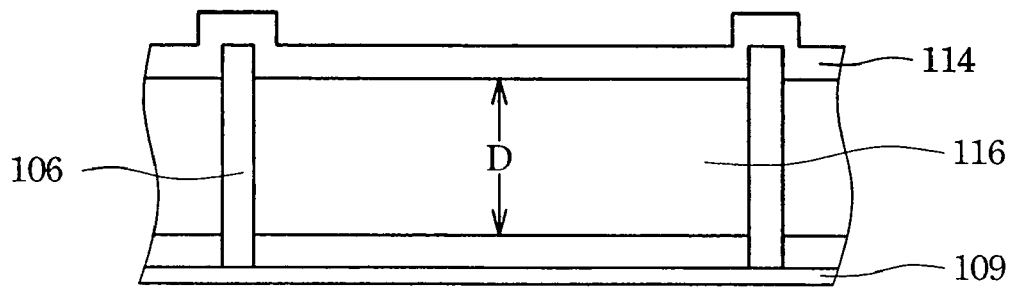
Figure 2:
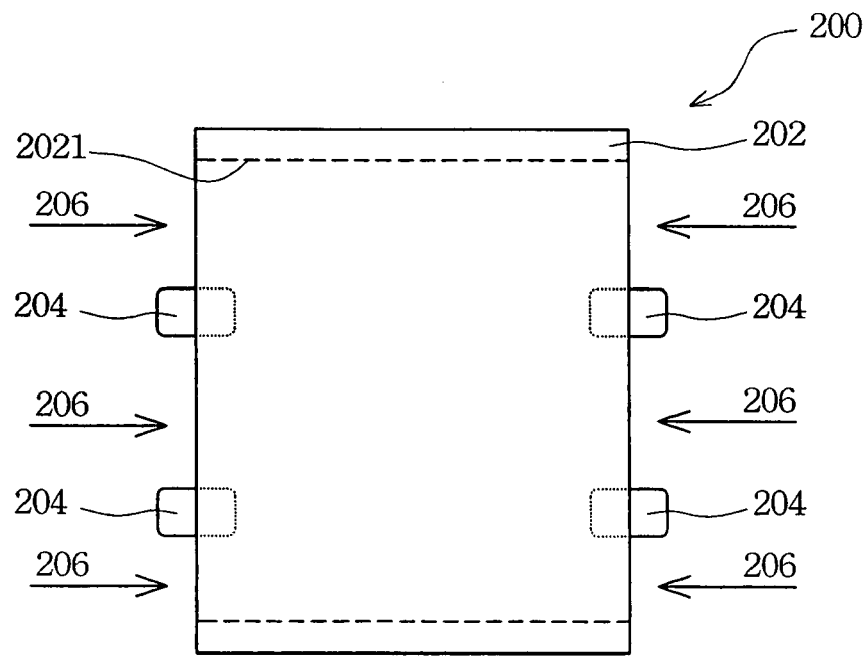
FIG. 2 illustrates a top view of a conventional optical interference display cell.

The development of the etching equipment using xenon difluoride etchant is not maturing, which is disadvantageous to the development and mass production of the optical interference display, and the etchant xenon difluoride is expensive and unstable. Therefore, if etching equipment used in semiconductor or typical planar display manufacture can be applied to perform a structure release etching process, the processing equipment of the optical interference display can be easily reorganized and consolidated, and the structure release etching process can be performed at a lower cost.

The reason that the etching equipment used in typical semiconductor or planar display manufacture is not suitable for use in the structure release etching process is the poor capacity thereof for lateral etching, and even if an etchant with a great etching property, for example, an etchant having a fluorine group or a chlorine group such as nitrogen trifluoride ($NF_3$) or sulphur hexafluoride ($SF_6$), is used, the etching rate is only between 3 micrometers and 10 micrometers per minute. This is slower than that for using xenon difluoride as an etchant by several to dozens of times. Therefore, this is very disadvantageous to the throughput of the optical interference display.

Remote plasma is conducted by first producing plasma in a plasma generator, filtering out a portion or all of the charged composition in the plasma, and then introducing the remaining plasma, the remote plasma, into a chamber to perform a reaction. Diffusion of the active composition is the main control mechanism for the lateral etching. Free radicals are the main composition of the remote plasma, so a life cycle of the remote plasma is longer and the structure release etching of the sacrificial layer is performed efficiently. Additionally, the free radicals are not charged and not easily affected by an electric field, so the effect of isotropic etching is better for being beneficial to lateral etching.

Furthermore, one way to increase the etching rate and reduce the etching time is to raise the temperature of the remote plasma etching process, since raising the temperature increases the energy of the free radicals in the remote plasma, decreases the activation energy of the reaction, and increases the rates of diffusion of molecules. However, in the current manufacturing process of the optical interference display cell, the supporters are formed from organic polymers such as polyurethane, epoxy resin and so on, and the structure release etching process is conducted after the supporters have been formed. Typically, since organic materials cannot resist high temperatures, the subsequent processing temperature for a construct comprised of elements made from organic composition provided therein must be kept within certain limits, typically under 250° C. Therefore, even though raising the temperature can increase the etching rate, there is still a limit as to how high the temperature can be raised.

In order to make the illustration of a method for manufacturing an optical interference display cell in the present invention more clear, an embodiment of the present invention herein takes an optical interference display cell structure as an example to explain advantages of the present invention.

Figure 3A:
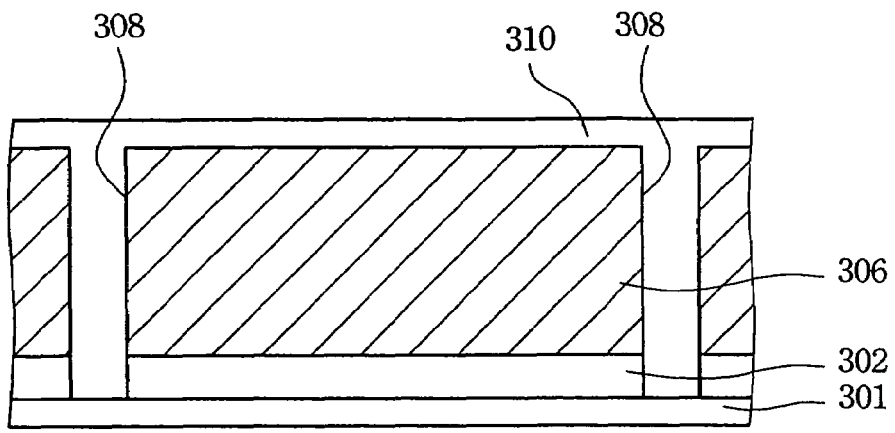
FIG. 3A to FIG. 3C illustrate a method for manufacturing an optical interference display cell structure in accordance with a preferred embodiment of the present invention.
Figure 3B:
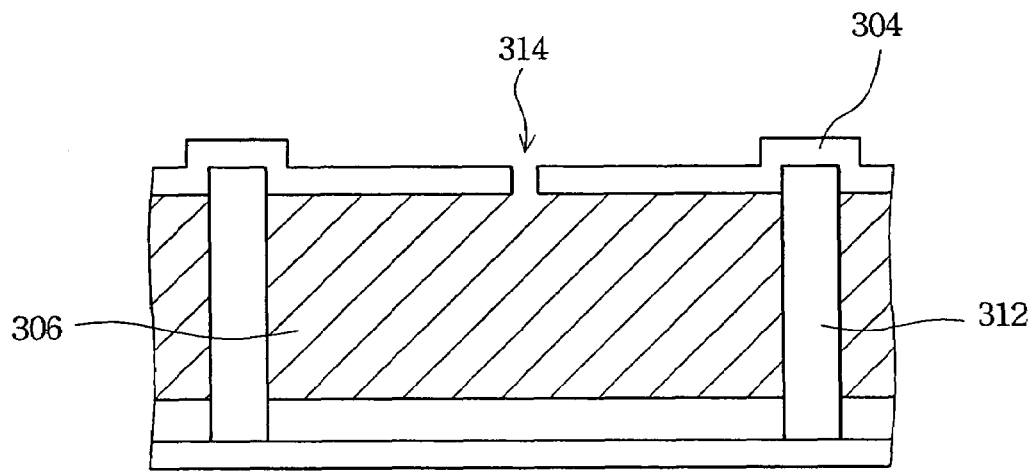
Figure 3C:
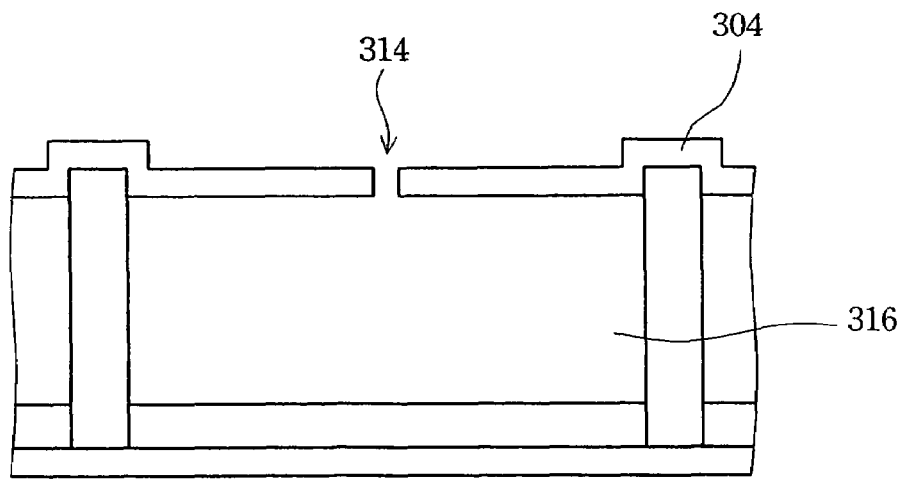

FIG. 3A to FIG. 3C illustrate a method for manufacturing an optical interference display cell structure in accordance with a preferred embodiment of the present invention. Referring to FIG. 3A, a first electrode 302 and a sacrificial layer 306 are formed on a transparent substrate 301 in sequence. The sacrificial layer 306 may be made of transparent material such as dielectric material, or opaque material such as metal material, polysilicon or amorphous silicon. In this embodiment, polysilicon is used as the material of the sacrificial layer 306. Openings 308 are formed in the first electrode 302 and the sacrificial layer 306 by a photolithography and etching process, and each of the openings 308 is suitable for forming a supporter therein.

Then, a material layer 310 is formed on the sacrificial layer 306 and fills up the openings 308. The material layer 310 is suitable for forming the supporter, and the material layer 310 is made of heat-resistant insulating inorganic material (e.g., silicate such as spin-on-glass, phosphosilicate glass (PSG), and borophosphosilicate glass (BPSG)) by a spin-coating process. Alternatively, the material layer 310 may be made of typical dielectric material (e.g., silicon oxide, silicon nitride, silicon oxynitride, metal oxide, etc.) by a chemical vapor deposition (CVD) process.

Referring to FIG. 3B, supporters 312 are defined by patterning the material layer 310 through a photolithographic etching process. Next, a second electrode 304 is formed on the sacrificial layer 306 and the supporters 312. The second electrode 304 may be provided with at least one hole 314 defined therein, thereby reducing the etching time of the subsequent structure release etching process. Alternatively, a chemical mechanical polishing process may be used to remove the portion of the material layer 310 above the sacrificial layer 306 in order to form the supporters 312.

Finally, the sacrificial layer 306 is etched by a remote plasma produced by using an etching reagent having a fluorine group or a chlorine group, such as, for example $CF_4$, $BCl_3$, $NF_3$, $SF_6$, as a precursor. The remote plasma etches the sacrificial layer 306 through the gaps (not shown) between the supporters, and, if the hole 314 is provided in the second electrode 304, the remote plasma can penetrate through the hole 314 to etch the sacrificial layer 306 such that the sacrificial layer 306 is removed by a structure release etching process to form a cavity 316 as illustrated in FIG. 3C.

Compared with conventional techniques, since the supporters are made of heat-resistant insulating inorganic materials, the structure release etching process can be performed at a temperature higher than 250° C. or at a temperature up to 500° C. When the temperature of the etching process is raised, the activation energy of the reaction between the active composition of the remote plasma, i.e., the free radicals and the material of the sacrificial layer, is reduced, thereby increasing the etching reaction rate and shortening the time needed in the entire structure release etching process.

In addition, the time needed in the structure release etching process can be further reduced by providing at least one hole in the deformable electrode, so that etching processes suitable for semiconductor or planar display processes can be applied in the structure release etching process of the optical interference display cell structure, thereby avoiding the difficulties resulting from reorganizing and consolidating the xenon difluoride etching equipment and other deposition equipment (or etching equipment). Furthermore, fabrication cost can be reduced because the expensive xenon difluoride etching process is not needed.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structure.

What is claimed is:

1. A microelectromechanical systems (MEMS) device, comprising:
   a first electrode formed over a substrate;
   a second electrode formed over the first electrode and spaced apart from the first electrode by a cavity, wherein the second electrode comprises at least one hole extending through the second electrode; and
   at least two heat-resistant supporters formed over the substrate, wherein the second electrode is formed over and is supported by said supporters, and wherein the supporters comprise an inorganic material.

2. The MEMS device of claim 1, wherein the supporters comprise an insulating material.

3. The MEMS device of claim 1, wherein the MEMS device comprises an optical interference display cell.

4. The MEMS device of claim 1, wherein the supporters each extend through an opening in the first electrode.

5. The MEMS device of claim 1, wherein the second electrode comprises a deformable electrode.

6. The MEMS device of claim 1, wherein the heat-resistant supporters comprise silicate or dielectric material.

7. The MEMS device of claim 6, wherein the heat-resistant supporters comprise silicate, wherein the silicate is selected from the group consisting of spin-on glass, phosphosilicate glass (PSG), borophosphosilicate glass (BPSG) and silicon oxide.

8. The MEMS device of claim 6, wherein the heat-resistant supporters comprise dielectric material, wherein the dielectric material is selected from the group consisting of silicon oxide, silicon nitride, silicon oxynitride, and metal oxide.

9. The MEMS device of claim 1, wherein the supporters are heat-resistant at a temperature higher than 250° C.

10. A microelectromechanical systems (MEMS) device, comprising:
    a first electrode formed over a substrate;
    a second electrode formed over the first electrode and spaced apart from the first electrode by a cavity, wherein the second electrode comprises at least one hole extending through the second electrode; and
    at least two inorganic supporters formed over the substrate, wherein the second electrode is formed over and is supported by said supporters.

11. A microelectromechanical systems (MEMS) device, comprising:
    a first electrode formed over a substrate;
    a second electrode formed over the first electrode and spaced apart from the first electrode by a cavity, wherein the second electrode comprises at least one hole extending through the second electrode; and
    at least two heat-resistant supporters formed over the substrate, wherein the second electrode is formed over and is supported by said supporters, and wherein the MEMS device comprises an optical interference display cell.

12. A microelectromechanical systems (MEMS) device, comprising:
    a first electrode formed over a substrate;
    a second electrode formed over the first electrode and spaced apart from the first electrode by a cavity, wherein the second electrode comprises at least one hole extending through the second electrode; and
    at least two heat-resistant supporters formed over the substrate, wherein the second electrode is formed over and is supported by said supporters, and wherein the supporters each extend through an opening in the first electrode.

* * * * *

UNITED STATES PATENT AND TRADEMARK OFFICE
CERTIFICATE OF CORRECTION

PATENT NO.       : 7,706,044 B2
APPLICATION NO.  : 11/413603
DATED            : April 27, 2010
INVENTOR(S)      : Wen-Jian Lin et al.

It is certified that error appears in the above-identified patent and that said Letters Patent is hereby corrected as shown below:

Page 4, at column 1, line 34, under U. S. Patent Documents, please delete "Mushika" and insert therefore -- Mushika et al. --.

Page 5, at column 2, line 46, under Foreign Patent Documents, please delete "11/1974" and insert therefore -- 1/1974 --.

Page 5, at column 2, line 37, under Other Publications, please delete "Aluminoa" and insert therefore -- Alumina --.

Page 5, at column 2, line 44, under Other Publications, please delete "compatable" and insert therefore -- compatible --.

Page 5, at column 2, line 50, under Other Publications, please delete "Maniature" and insert therefore -- Miniature --.

Page 5, at column 2, line 53, under Other Publications, please delete "Internatioal" and insert therefore -- International --.

Page 5, at column 2, line 54, under Other Publications, please delete "Youk" and insert therefore -- York --.

Page 6, at column 1, line 9, under Other Publications, please delete "microelectomechanical systesm" and insert therefore -- microelectromechanical systems --.

Signed and Sealed this

Twenty-third Day of November, 2010

David J. Kappos
*Director of the United States Patent and Trademark Office*

Page 6, at column 1, line 10, under Other Publications, please delete "Comparision" and insert therefore -- Comparison --.

Page 6, at column 1, line 20, under Other Publication, please delete "Frist" and insert therefore -- First --.

Page 6, at column 1, line 24, under Other Publication, please delete "Rejecton" and insert therefore -- Rejection --.

Page 6, at column 1, line 26, under Other Publication, please delete "Rejecton" and insert therefore -- Rejection --.

Page 6, at column 1, line 29, under Other Publication, please delete "17031714" and insert therefore -- 1703/1714 --.

Page 6, at column 1, line 32, under Other Publication, please delete "Survace" and insert therefore -- Surface --.

Page 6, at column 1, line 35, under Other Publication, please delete "Lauderale" and insert therefore -- Lauderdale --.

Page 6, at column 1, line 36, under Other Publication, please delete "230235" and insert therefore -- 230/235 --.

Page 6, at column 1, line 38, under Other Publication, please delete "1723" and insert therefore -- 17/23 --.

Page 6, at column 1, line 40, under Other Publication, please delete "577580" and insert therefore -- 577/580 --.

Page 6, at column 1, line 46, under Other Publication, please delete "Quanum" and insert therefore -- Quantum --.

Page 6, at column 1, line 52, under Other Publication, please delete "Photoics" and insert therefore -- Photonics --.

CERTIFICATE OF CORRECTION (continued)
U.S. Pat. No. 7,706,044 B2

Page 6, at column 1, line 52, under Other Publication, please delete "Lettes" and insert therefore -- Letters --.

Page 6, at column 1, line 67, under Other Publication, please delete "Leters" and insert therefore -- Letters --.

Page 6, at column 1, line 70, under Other Publication, please delete "568573" and insert therefore -- 568/573 --.

Page 6, at column 2, line 28, under Other Publication, please delete "Reconfigurabl" and insert therefore -- Reconfigurable --.

Page 6, at column 2, line 38, under Other Publication, please delete "(0125/2006)" and insert therefore -- Jan. 25, 2006 --.

Page 6, at column 2, line 68, under Other Publication, please delete "7073" and insert therefore -- 70/73 --.

Page 7, at column 1, line 1, under Other Publication, please delete "Electromechancal" and insert therefore -- Electromechanical --.